United States Patent

Bolander et al.

(10) Patent No.: US 7,132,935 B2
(45) Date of Patent: Nov. 7, 2006

(54) SINGLE PERSON VEHICLE LIGHT TEST

(75) Inventors: Thomas E. Bolander, Flint, MI (US); Alexander J. Roberts, Commerce Township, MI (US)

(73) Assignee: General Motors Corporation, Detroit, MI (US)

( * ) Notice: Subject to any disclaimer, the term of this patent is extended or adjusted under 35 U.S.C. 154(b) by 105 days.

(21) Appl. No.: 10/850,725

(22) Filed: May 21, 2004

(65) Prior Publication Data

US 2005/0258948 A1   Nov. 24, 2005

(51) Int. Cl.
*B60Q 1/00* (2006.01)

(52) U.S. Cl. ..................................... 340/438; 340/458

(58) Field of Classification Search ................ 340/438, 340/458, 459, 475, 478, 641, 642; 307/10.8
See application file for complete search history.

(56) References Cited

U.S. PATENT DOCUMENTS

| | | | | |
|---|---|---|---|---|
| 4,866,390 A | * | 9/1989 | Butchko | 324/504 |
| 5,095,276 A | * | 3/1992 | Nepil | 324/504 |
| 5,899,947 A | * | 5/1999 | Hall et al. | 701/33 |
| 6,066,951 A | * | 5/2000 | Maass | 324/414 |
| 6,265,878 B1 | * | 7/2001 | Traub | 324/504 |
| 6,674,288 B1 | * | 1/2004 | Gumbel et al. | 324/504 |

* cited by examiner

Primary Examiner—John Tweel, Jr.
(74) Attorney, Agent, or Firm—Laura C. Hargitt

(57) ABSTRACT

Methods and apparatus are provided whereby a single person can test exterior lights of a vehicle. The apparatus comprises a controller coupled to the lights for turning light groups ON and OFF in a predetermined sequence in response to a START TEST signal and vehicle safe-status. Vehicle status sensors are provided for reporting to the controller the status of predetermined vehicle elements whose safe status is a prerequisite for testing the lights. A user actuated switch coupled to the controller provides the START TEST signal. Vehicle safe-status desirably includes transmission in PARK and motor OFF. An internal memory coupled to the controller stores data on prior tests and prompts the user that another test is needed. Prompts are also desirably provided to tell the user what changes need to be made to achieve safe-status for the test. Post test, the vehicle desirably returns to its prior state.

19 Claims, 3 Drawing Sheets

SINGLE PERSON VEHICLE LIGHT TEST

TECHNICAL FIELD

The present invention generally relates to testing vehicle lights, and more particularly to a means and method whereby a single person can verify proper functioning of the vehicle lights, especially the external lights.

BACKGROUND

The proper functioning of some lights and indicators on a vehicle, e.g., most interior lights and indicators can be tested by one person sitting in the vehicle and operating the light switches or checking to see whether the warning lights or other indicators illuminate when the ignition is first turned on. For some exterior lights, such as the head lights, tail lights, parking lights, emergency flashers and turn signals, proper operation can be tested by a single individual by turning on the appropriate light switch, exiting the vehicle, observing the functioning of the lights, re-entering the vehicle and turning those lights' off. This process of SWITCH-ON/EXIT/OBSERVE/RETURN/SWITCH-OFF must be repeated separately for each light group and light function, thus requiring the user to exit and re-enter the vehicle a half a dozen or more times even for a simple passenger car system. With more complex vehicles having more complex exterior light arrangements, even more SWITCH-ON/EXIT/OBSERVE/RETURN/SWITCH-OFF cycles may be needed.

Some lights such as the brake lights and back-up lights cannot be safely tested by a single person without mirrors or other reflective surfaces arrange at the appropriate location because the person must be or should be in the car to energize the lights and therefore cannot or should not exit while the light is supposed to be on to verify that it is functioning properly. For example, the user must depress the brake pedal to energize the brake lights. Similarly, it is generally unsafe to place the vehicle in reverse gear to activate the back-up lights and then exit while leaving it in gear. Generally two people are used to test the brake lights, back-up lights and similar user operated light functions. Thus, a need continues to exist for a system and method that allows a single person to verify the proper functioning of vehicle lights, especially exterior lights while the vehicle remains in a safe state.

Accordingly, it is desirable to provide a means and method whereby vehicle lights automatically turn on and off in an appropriate sequence without requiring the user to constantly exit and enter the vehicle during the test or without requiring the presence of two people or elaborate reflector systems or placing the vehicle in an unsafe state. In addition, it is desirable that the user be prompted to perform the test at regular intervals. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided whereby a single person can test exterior lights of a vehicle. The apparatus comprises a controller coupled to the lights for turning light groups ON and OFF in a predetermined sequence in response to a START test signal and vehicle safe-status. Vehicle status sensors report to the controller the status of predetermined vehicle elements whose safe status is a prerequisite for testing the lights. A user-actuated switch coupled to the controller provides the START TEST signal. Controller driven switches by-pass functions (e.g., the brake light switch) that ordinarily have to be activated by the user to illuminate particular lights. A display is desirably provided for user prompts and touch-screen activation functions. The prompts can tell the user that a test is needed and what changes need to be made to achieve safe-status. Vehicle safe-status desirably includes transmission in PARK and motor OFF. An internal memory coupled to the controller stores data on prior tests so that the user can be alerted that another test is needed. Post test, the controller desirably returns the lights to their prior state.

A method is provided for single-person testing of exterior lights of a vehicle, comprising, in either order, determining whether a light test request signal (LTRS) has been received and the vehicle is in a safe state for a single-person exterior light test, and if so, energizing remotely controllable switches coupled to the exterior lights to flash groups of the exterior lights ON and OFF for predetermined times. In a preferred embodiment, an on-board record is checked for elapsed events since a prior test and if this yields a result equal or greater than a predetermined re-test threshold, a prompt is displayed to the user indicating that a current light test is recommended. In the event that the vehicle is not in a safe state for the test, a warning prompt is displayed that, preferably, tells the user what corrective action to take. If during the test, the vehicle status changes so that it is no longer in a safe-state, the test is terminated. At the end of the test, the vehicle lights are desirably returned to their pre-test status.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
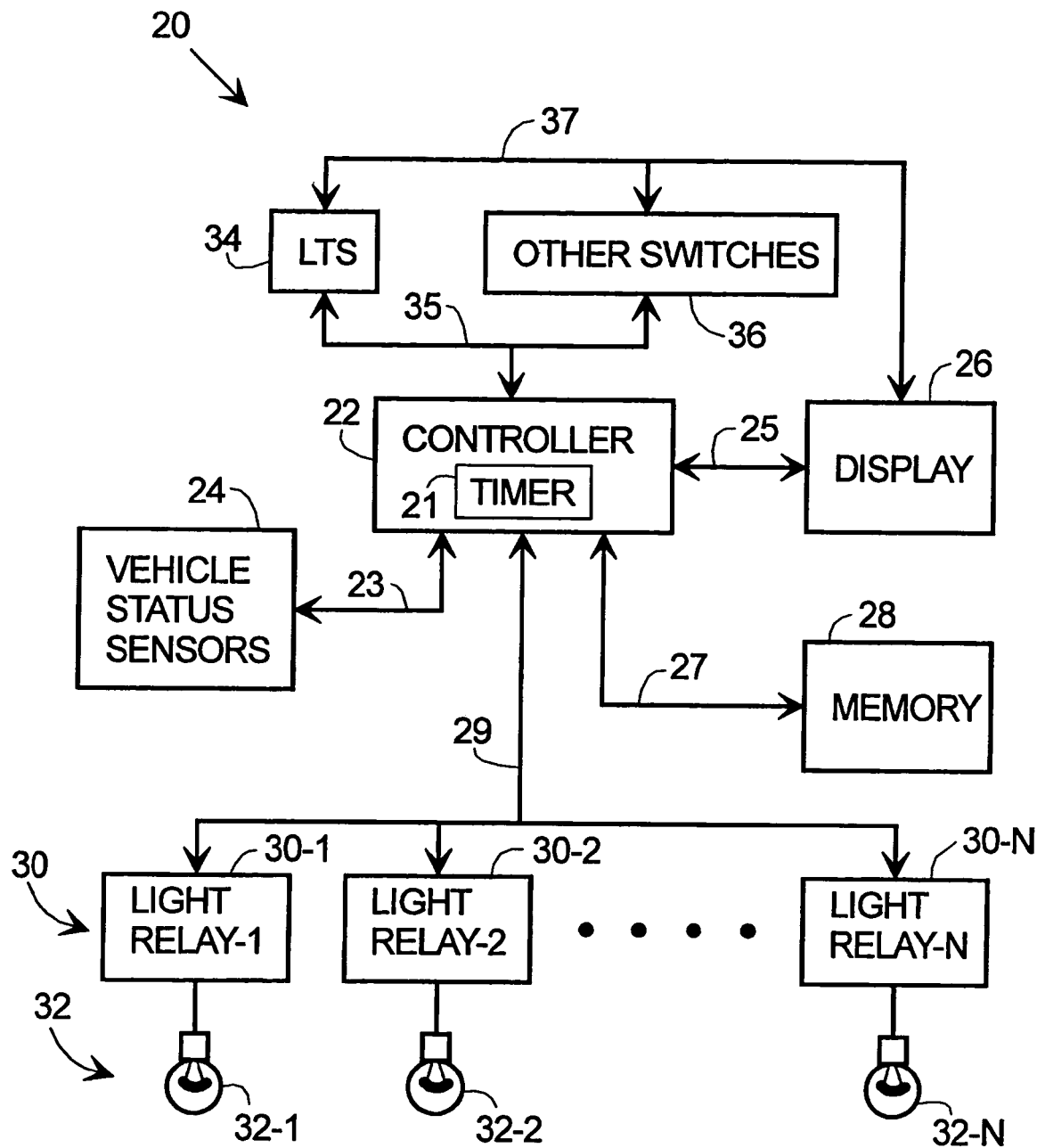
FIG. 1 is a simplified electrical schematic diagram of a light test system according to the present invention.

FIG. 1 is a simplified electrical schematic diagram of light test system 20 according to the present invention. System 20 comprises controller 22 having associated therewith one or more timers 21, vehicle status sensors 24 coupled to controller 22 by bus or leads 23, display 26 coupled to controller 22 by bus or leads 25, memory 28 coupled to controller 22 by bus or leads 27, light relays 30 coupled to light bulbs or other light emitters 32, that is, relay 30-1 is coupled to light 32-1, relay 30-2 to light 32-2, through relay 30-N coupled to light 32-N. Relays 30 may be the primary ON/OFF relays for a particular light or may be auxiliary relays utilized merely for testing the light. Relays 30 may be actuated by controller 22 and, in some cases, also directly by ON/OFF switches controlled directly by the user. For example and not intended to be limiting, in the case of the brake lights one of relays 30 controlled by processor 22 is placed in parallel with the brake light switch so that the operation of the brakes can be simulated during the brake light portion of the light test. Connections 29 between controller 22 and relays 30 may be by discrete leads, parallel bus(es), serial bus(es) or a combination thereof. Further, the various buses or leads shown in system 20 may be electrical wires or optical cables or wireless links or combinations thereof and system 20 is not intended to be limited to a particular type of communication among its various elements. Any type of relay may be used for relays 30. Non-limiting examples are magnetic replays, mechanical relays, optical relays and solid-state semiconductor device or integrated circuit relays of various types. As used herein, the word relay is intended to include all types of remotely operable switches.

System 20 also comprises user operated "light test switch" (abbreviated as LTS) 34 and other user operated switches 36. Switch 34 is operated by the user to initiate the automatic light test sequence of the present invention, that is, it sends a light test request signal (LTRS) to controller 22. Switches 34, 36 are desirably coupled to controller 22 by leads or buses 35 but this is not intended to be limiting. Other coupling means may also be used. Switches 34, 36 may share bus 35 as shown here or be independently coupled to controller 22. Either arrangement is useful. Switches 34, 36 may be of any type and, as indicated by symbolic lead 37, may be operated by touching an appropriately labeled image or "button" on the screen of display 26. When this occurs, controller 22 operating in conjunction with display 26 deduces that the user desires that the function represented by, for example, a screen "button" corresponding to LTS 34 is intended to be activated, whereupon controller 22 interprets the touch screen action as if a mechanical or other physical type of switch had been toggled from OFF to ON (or vice-versa) by the user and carries out the corresponding command or function. Accordingly, the depiction of switches 34, 36 as separate elements on FIG. 1 is not intended to be limiting or pre-suppose a particular type of switch and reference to the operation of LTS switch 34 and/or other switches 36 is intended to include touch screen operations. Also, while vehicle status sensors 24 and other switches 36 are illustrated in FIG. 1 as being separate elements of system 20, this is merely for convenience of description and status sensors 24 can be considered to include other switches 36, it being understood by those of skill in the art that the status of a vehicle element may be determined, among other things, by switch settings.

When a user activates LTS 34 indicating that he or she desires to perform a 'light test' (i.e., sends an LTRS to controller 22), then controller 22 operating in cooperation with memory 28, vehicle status sensors 24 and relays 30 determines whether the vehicle is in a safe state for such a test to be performed. Since the user must exit the vehicle to observe the test operation for exterior lights, it is preferable among other things, that the vehicle be immobilized. As discussed more fully in connection with FIG. 2, various safety criteria are preferably verified before the light test can commence. Assuming that the safety criteria established by the system designer and held in memory 28 are satisfied, then controller 22 begins instructing various ones of relays 30 to flash selected lights 32 on and off a predetermined number of times or for a predetermined time, these values being generally retrieved from memory 28 or equivalent. During such ON/OFF repetitions, the user has an opportunity to verify that the lights being activated are working or not. As explained more fully in connection with FIG. 3, it is preferred that the various lights are flashed in groups. This makes it easier for the user to understand which lights should be flashing during a particular group test, and so be able to recognize if a particular light in the group is not working. In this way, the user does not have to memorize a long and complex light test sequence, since the grouping of the lights makes it self-evident when a particular light is defective.

While the light test sequence is underway, controller 22 monitors vehicle status sensors 24, LTS 34 and timer 21 to determine whether their state has change, e.g., because the user has turned the ignition or other key or started the vehicle or shifted out of 'park' or deactivated the LTS switch or the test timer has expired or some other event has occurred indicating that the light test should not continue, whereupon controller 22 shuts off any of relays 30 that remain on for the test and returns system 20 to its pre-test state. The operation of system 20 will be more fully understood by reference to FIG. 2.

Figure 2:
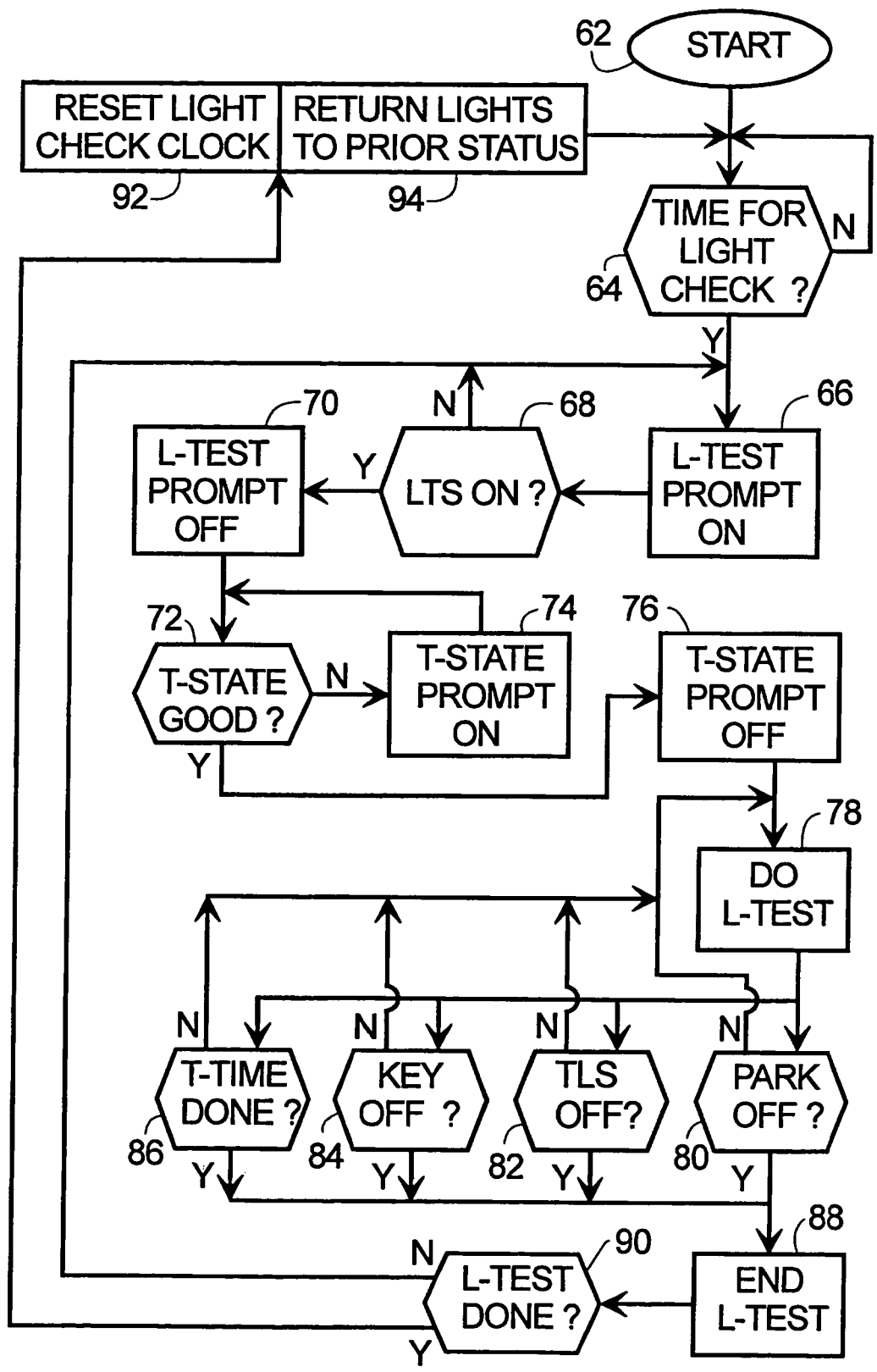
FIG. 2 is a simplified flow chart illustrating the method of the present invention according to a preferred embodiment.

FIG. 2 is a simplified flow chart illustrating method 60 of the present invention according to a preferred embodiment. Method 60 is conveniently carried out by system 20 of FIG. 1, but other on-board electronics systems may also be used. Method 60 commences with START 62, which preferably occurs on vehicle power-up, e.g., when the ignition switch or vehicle entry control or other initiating function is turned on. In initial TIME FOR LIGHT CHECK? query 64, controller 22 desirably consults clock or calendar values stored in memory 28 to determine whether a predetermined time $t=t1$ has elapsed since the last time a 'light test' was performed. A suitable value for t1 is about 30 days but larger and smaller values can also be used. This time duration is not critical but is a compromise between avoiding user irritation by asking for a 'light test' too frequently versus the risk of undetected light failures by asking too infrequently. Thus, t1 can be appropriately chosen by the designer or the vehicle user depending upon his or her circumstances.

If the outcome of query 64 is NO (FALSE) then method 60 loops back and query 64 is repeated. Meanwhile, processor 22 continues to update memory 28 to reflect the additional time that has passed since the last test. While a simple elapsed-days calendar based test such as that described above is useful, other tests may also be used. For example and not intended to be limiting, measuring the number of hours that that the vehicle has been operated since the last 'light test,' or measuring the number of hours that critical lights (e.g., head-lamps) have been on, or measuring the number of times that certain functions or certain lights have been switched ON and OFF, or a combination of any or all of these with or without a simple calendar test may be used. The parameter or combination of parameters to be monitored for triggering a 'light test' request can be chosen by the designer (or the user) depending upon the intended operation of the vehicle.

If the outcome of query 64 is YES (TRUE), then method 60 desirably proceeds to LIGHT TEST (abbreviated L-TEST) PROMPT ON step 66 wherein controller 22 causes display 26 to present to the user a warning or alert message that it is time for the user to perform a 'light test.' This warning or alert message may take any form suitable for the vehicle user and location and type of display. The warning or alert message may be visual or audible or a combination thereof. Method 60 then proceeds to LTS ON? query 68 wherein controller 22 determines whether or not the user has activated LTS switch 34 (or its touch screen equivalent). If the outcome of query 68 is NO (FALSE) then method 60 returns to L-TEST PROMPT ON step 66, and steps 66-68-66-68-etc., desirably repeat while waiting for the user to activate LTS 34 or equivalent. If the outcome of query 68 is YES (TRUE) then method 60 proceeds to optional L-TEST PROMPT OFF step 70 wherein controller 22 causes the screen and or audible prompt provided by display 26 in step 66 to be turned off. Step 70 is convenient but not essential at this point. Step 70 may be delayed until later in the sequence, as for example, after steps 80–86, but this is not intended to be limiting.

Method 60 then proceeds to TEST STATE (abbreviated as T-STATE) GOOD? query step 72 wherein processor 22 in cooperation with vehicle status sensors 24 determines whether the vehicle is in a safe state for the 'light test' to be conducted. The criteria of what constitutes a 'safe' state are chosen by the system designer. The following are non-limiting example of criteria that are believed desirable: (1) transmission in park and (2) motor off and, optionally, (3) ignition key in the "accessories" position. Other or alternate criteria may be chosen by the system designer and more or fewer criteria may be used. According to method 60, query 72 determines whether the criteria chosen by the designer (e.g., (1) and (2) and optionally (3) listed above) are satisfied. This step is preferably carried out by controller 22 polling appropriate vehicle status sensors 24 and comparing the results to values store in memory 28 but any other convenient means may also be used. Persons of skill in the art will understand how to select appropriate sensors to provide the desired status information.

If the outcome of query 72 is NO (FALSE) indicating that the vehicle is not in a safe state, then method 60 desirably proceeds to TEST STATE (abbreviated as T-STATE) PROMPT ON step 74 wherein controller 22 causes display 26 to indicate visually or audibly or both that an unsafe condition exists. T-STATE PROMPT ON step 74 desirably indicates to the user what condition(s) should be corrected to reach a safe vehicles status for the 'test lights' operation to proceed. For example, if the vehicle is not in park, display 26 may show or recite or both the message "Place transmission in park" or equivalent, or if the motor is still running display 26 may show or recite or both the message "Shut off motor" or the like, or whatever other message(s) are needed to indicate to the user the corrective action required to meet the safe state criteria established by the designer. Following T-STATE PROMPT ON step 74, method 60 returns to query 72 and remains in the loop query 72-prompt 74 until query 72 yields a YES (TRUE) outcome, whereupon method 60 executes T-STATE PROMPT OFF step 76.

Following step 76, method 60 proceeds to DO LIGHT TEST (abbreviated DO L-TEST) step 78 wherein controller 22 in conjunction with instructions and time duration values stored in memory 28 activates relays 30 in the appropriate sequence and groups to test the lights for predetermined durations, as explained in more detail in connection with FIG. 3. At this point the user can exit the vehicle and observe the automatic light test sequence. As will be subsequently explained in connection with FIG. 3, controller 22 preferably turns the various lights on and off in groups for predetermined times or numbers of ON/OFF alterations. This is desirably done in groups in a simple and readily understood sequence, e.g., headlights ON/OFF, high beams. ON/OFF, tail lights ON/OFF, etc. In this manner, the user can easily observe whether any particular lights are not working properly.

Once the 'light test' sequence is launched by DO L-TEST step 76 method 60 proceeds to queries 80-86 which check to see whether any of the conditions prompting termination of the light check test are subsequently met. Queries 80-86 may be executed in any order or in parallel as indicated in FIG. 2. Either arrangement is useful. In PARK OFF? query 80, controller 22 determines, for example, using sensors 24, whether the gearshift has been moved from the 'park' position, thereby violating one of the preferred safe-status conditions. If the outcome of query 80 is NO (FALSE) then method 60 loops back to DO L-TEST step 78 and the light test is not interrupted for this reason. If the outcome of query 80 is YES (TRUE) then method 60 proceeds to END L-TEST step 88 wherein controller 22 terminates the light test steps illustrated in FIG. 3 at whatever point they have reached up to then. In LTS OFF? query 82 controller 22 interrogates LTS 34 (or its touch screen equivalent) to determine whether the user has toggled LTS 34 to the OFF state. If the outcome of query 82 is NO (FALSE) then method 60 loops back to DO L-TEST step 78 and the light test is not interrupted for this reason. If the outcome of query 82 is YES (TRUE) then method 60 proceeds to END L-TEST step 88 wherein controller 22 terminates the light test steps illustrated in FIG. 3 at whatever point they have reached up to then. In KEY OFF? query 84 controller 22 interrogates sensors 24 and/or other switches 36 to determine whether the user has changed the state, for example, of the ignition switch, turned it OFF or turned it ON to start the motor, etc. Other switches or vehicle status sensors may also be checked and a part of KEY OFF? query 84, such as for example and not intended to be limiting, door locks or security system settings. This is generally up to the system designer.

If the outcome of query 84 is NO (FALSE) then method 60 loops back to DO L-TEST step 78 and the light test is not interrupted for this reason. If the outcome of query 84 is YES (TRUE) then method 60 proceeds to END L-TEST step 88 wherein controller 22 terminates the light test steps illustrated in FIG. 3 at whatever point they have reached up to then. In TEST TIME (abbreviated T-TIME) DONE? query 86, controller 22 interrogates timer 21 or equivalent and memory 28 to determine whether the predetermined time or times allocated for the 'light test' has been reached. A total light test time of about 1 to 4 minutes is useful and about 1 to 2 minutes is convenient and about 1 minute is preferred, but larger or smaller total light test times may also be used. If the outcome of query 86 is NO (FALSE) indicating that the light test sequence is not yet completed, then method 60 loops back to DO L-TEST step 78 and the light test is not interrupted for this reason. If the outcome of query 86 is YES (TRUE) then method 60 proceeds to END L-TEST step 88 wherein controller 22 terminates the light test steps illustrated in FIG. 3 at whatever point they are at that time. At least one full light test cycle or sequence should have been completed before the light test is terminated by a time-out in step 86.

Figure 3:
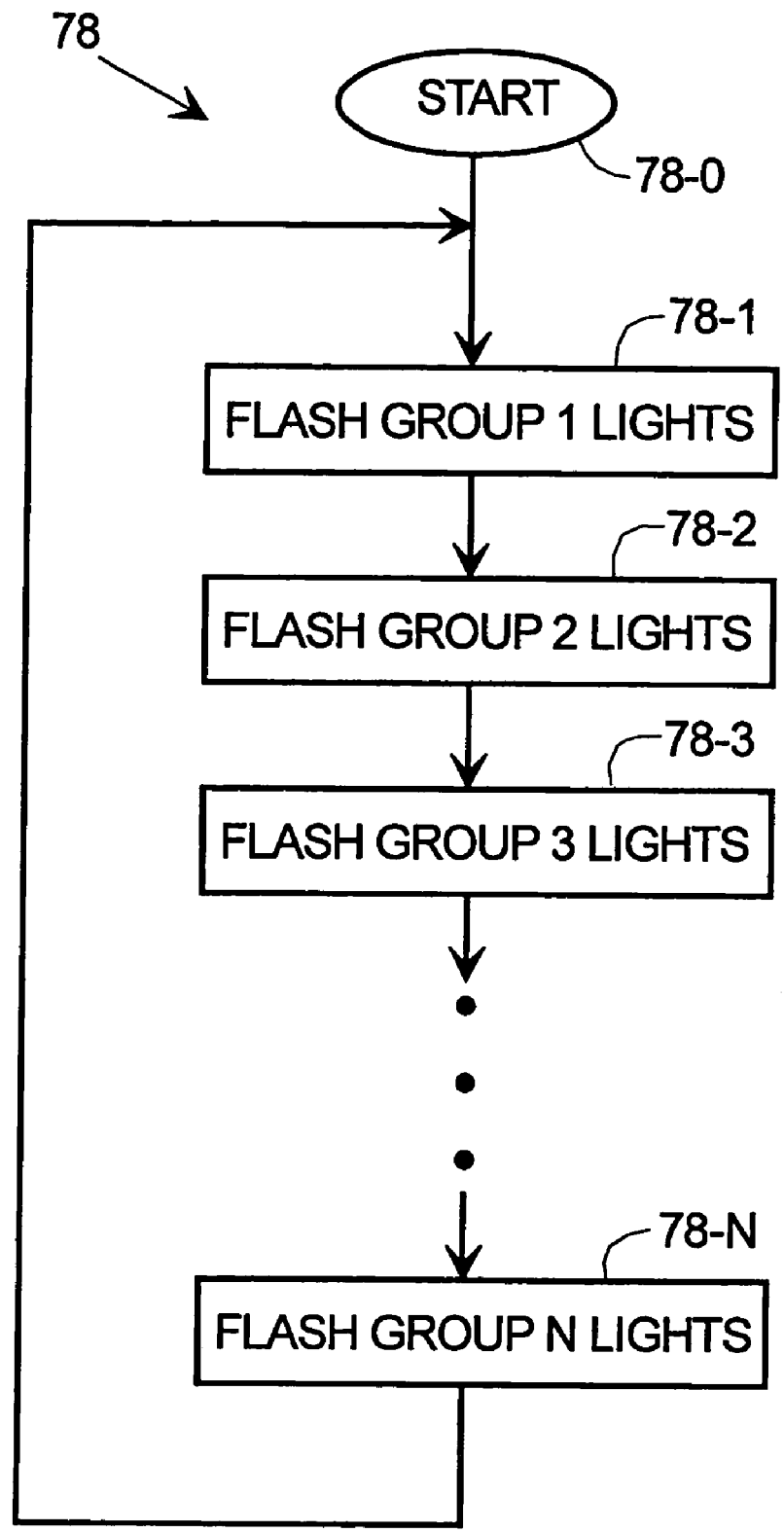
FIG. 3 is a simplified flow chart of a portion of the method illustrated in FIG. 2 showing additional details.

Following END L-TEST step 88 method 60 desirably but not essentially proceeds to LIGHT TEST (abbreviated L-TEST) DONE? query 90 wherein it is determined whether or not a complete sequence through all of the test groups illustrated in FIG. 3 has been completed. If the outcome of query 90 is NO (FALSE) indicating that not all of the lights were toggled ON and OFF during the test period (e.g., because of a user initiated vehicle status change), then method desirably returns to L-TEST PROMPT ON step 66, to remind the user that the light test was not fully completed. If the outcome of query 90 is YES (TRUE) indicating that a complete test sequence of all of the various groups was executed, then method 60 desirably proceeds to RESET LIGHT CHECK CLOCK step 92 wherein the clock or calendar or other 'light test' tracking criteria measuring how often the light test should be performed is reset to its initial value. Method 60 also, preferably but not essentially, performs RETURN LIGHTS TO PRIOR STATUS step 94 wherein the light settings are returned to their status prior to initiating the light test. Steps 92, 94 may be performed in either order. Method 60 then returns to start 62 and initial query 64.

FIG. 3 is a simplified flow chart of portion 78 of the method illustrated in FIG. 2 showing additional details. Portion 78 begins with START 78-0 which corresponds to the initiation of DO L-TEST step 78. In the DO L-TEST step, controller 22 flashes each predetermined group of lights ON and OFF a predetermined number of times or for a predetermined elapsed time. For example, and not intended to be limiting, Group 1 can comprise the brake and tail lights, Group 2 the turn signals and parking lights, Group 3 the high and low beams of the main headlights, and so forth through Group N until all of the lights are assigned to logical groups. Controller 22 using timer 21 or equivalent, turns the lights in each group ON and OFF a predetermined number of times or for predetermined time durations. For example and not intended to be limiting, controller 22 alternates the brake and tails lights of Group 1 about every 5 seconds for a total of about 4 alterations or about 20 seconds, whichever comes first. Then controller 22 proceeds to Group 2 and alternates the turn signals and parking lights about every 5 seconds for a total of about 4 alterations or about 20 seconds, whichever comes first. Then controller 22 proceeds to Group 3 and alternates the low and high beams on the headlights about every 5 seconds for a total of about 4 alterations or about 20 seconds, whichever comes first. These examples are not intended to be limiting and larger or smaller values of the number of alterations or the time duration may be used depending upon the type of vehicle and the needs of the user. In the foregoing example, the lights were tested in a particular sequence, that is, Group1, then Group 2, then Group3 and so forth, but this is merely for convenience of explanation and not intended to be limiting. It will be understood based on the description herein that light groups 78-1 through 78-N may be tested in any order and the order can be varied.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system permitting a single person to test the lights of a vehicle, wherein the lights are normally actuated by at least one light switch that is responsive to user operated control, the system comprising:
    a controller coupled to the lights for turning groups of lights ON and OFF in a predetermined light test sequence in response to a signal when predetermined vehicle safe-status criteria are met;
    vehicle status sensors coupled to the controller and configured to report to the controller the status of predetermined vehicle elements whose safe status is a prerequisite for testing the lights; and
    a plurality of switches each coupled to the controller and to at least one of the lights, wherein each of the switches is configured to turn the at least one of the lights ON or OFF in response a signal received from the controller: and wherein the plurality of switches comprise one or more remotely controllable switches coupled to and actuated by the controller, wherein the one or more remotely controllable switches are coupled in parallel with the at least one light switch so as to illuminate the lights without normal action by the user, when turned on by the controller.

2. The system of claim 1 further comprising memory coupled to the controller for storing the predetermined light test sequence.

3. The system of claim 1 wherein the vehicle status sensors include a vehicle ignition switch.

4. The system of claim 1 wherein the vehicle status sensors include means for determining when a vehicle transmission has been placed in PARK.

5. The system of claim 1 further comprising a display coupled to the controller for displaying various messages generated by the controller prompting the user to perform the light test or place the vehicle in a safe status.

6. The system of claim 5 wherein the display includes touch-screen switch functions and the switch means comprises one of such touch-screen functions.

7. The system of claim 1 wherein the lights comprise brake lights.

8. The system of claim 1 wherein the lights comprise one or more back-up lights.

9. A method for single-person testing of exterior lights of a vehicle, comprising:
    checking an on-board record for elapsed events since a prior test of the exterior lights and if such checking step yields a result equal or greater than a predetermined re-test threshold, causing a prompt to be displayed to the user indicating that another light test is recommended;
    following the checking step, determining, in either order, whether a light test request signal has been received and whether the vehicle is in a safe state for a single-person exterior light test, and if so;
    energizing remotely controllable switches coupled to the exterior lights to flash groups of the exterior lights ON and OFF for predetermined times without normal action by the user.

10. The method of claim 9 further comprising causing a warning prompt to be displayed to the user if the vehicle is not in a safe state for a single-person exterior light test.

11. The method of claim 10 wherein the warning prompt includes one or more suggestions as to how to place the vehicle in a safe state for a single person exterior light test.

12. The method of claim 9 further comprising terminating the energizing step if status of the vehicle changes to a non-safe state.

13. The method of claim 9 wherein the step of determining whether the vehicle is in a safe state comprises determining whether the vehicle ignition switch is in a predetermined position.

14. The method of claim 9 wherein the step of determining whether the vehicle is in a safe state comprises determining whether the vehicle transmission is in a predetermined position.

15. A method for single person tests of exterior lights of a vehicle, comprising:

displaying a prompt generated by an on-board record keeping means that an exterior light test is recommended;
receiving a signal to initiate a current exterior light test;
determining whether the vehicle is in a safe state for a single person exterior light test; and
  if not displaying a prompt alerting the user that the vehicle is not in a safe state for a single person exterior light test, and
  if so, causing the exterior lights of the vehicle to flash ON and OFF for predetermined periods or repetitions, and thereafter
returning the vehicle exterior lights to their status prior to the test.

16. The method of claim 15 wherein the determining step comprises determining whether the vehicle transmission is in PARK position and the engine is OFF.

17. The method of claim 15 wherein the displaying step includes displaying a visual reminder.

18. The method of claim 15 wherein the causing step includes causing the exterior lights to flash ON and OFF in groups and not all at once.

19. The method of claim 15 wherein the causing step includes causing the exterior lights to flash ON and OFF in groups and the groups to illuminate in a predetermined sequence.

* * * * *